FIP8106 XR 3,862,413

T5322 Y
X 5008H (2)

United States [11] 3,862,413

Brienza [45] Jan. 21, 1975

[54] APPARATUS FOR PROVIDING PULSES HAVING ELECTRONICALLY VARIABLE CHARACTERISTICS

[75] Inventor: Michael J. Brienza, Westport, Conn.

[73] Assignee: United Aircraft Corporation, East Hartford, Conn.

[22] Filed: Dec. 15, 1972

[21] Appl. No.: 315,716

[52] U.S. Cl. .......... 250/199
[51] Int. Cl. .......... H04b 9/00
[58] Field of Search .......... 250/199; 332/7.51

[56] References Cited

UNITED STATES PATENTS

| | | | |
|---|---|---|---|
| 3,055,258 | 9/1972 | Hurvitz | 332/7.51 |
| 3,330,956 | 7/1967 | Wade | 250/199 |
| 3,539,245 | 11/1970 | Brienza | 250/199 |
| 3,573,465 | 4/1971 | King et al. | 250/199 |
| 3,638,024 | 1/1972 | Chen et al. | 250/199 |
| 3,661,441 | 5/1972 | Uchida et al. | 250/199 X |
| 3,679,288 | 7/1972 | Harris | 250/199 |
| 3,711,823 | 1/1973 | Green | 332/7.51 X |
| 3,727,062 | 4/1973 | Foster | 250/199 |
| 3,761,716 | 9/1973 | Kapron et al. | 250/199 |

*Primary Examiner*—Robert L. Griffin
*Assistant Examiner*—Aristotelis M. Psitos
*Attorney, Agent, or Firm*—Anthony J. Criso

[57] ABSTRACT

A system for providing optical and electronic pulses having various intensity profiles and durations up to several hundred picoseconds is disclosed. Nominally picosecond pulses of linearly polarized, electromagnetic energy from a mode-locked laser are scattered internal of a birefringent crystal by a colinear acoustic signal of preselected characteristics to produce the output pulses. The acoustic signal is initiated with a radio frequency (RF) electric signal which is electronically controlled and variable. In an alternate embodiment, the optical output is passed through an optical detector and converted into an electrical output signal.

7 Claims, 9 Drawing Figures

350/161R

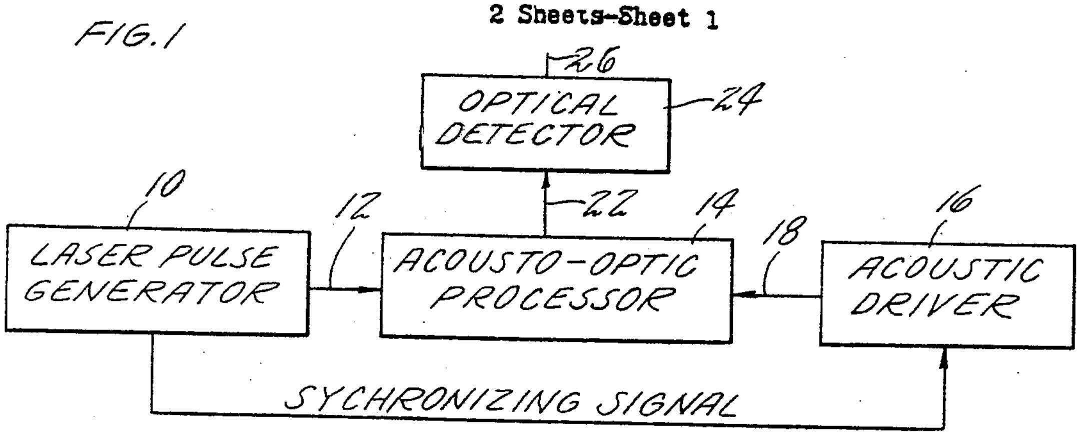
FIG. 2
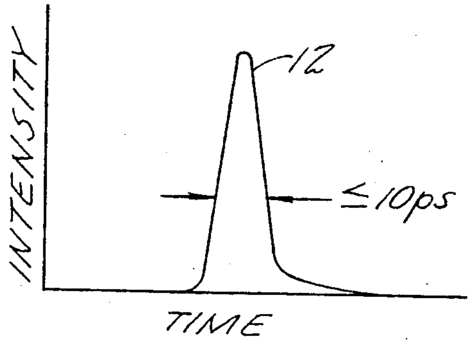
FIG. 3
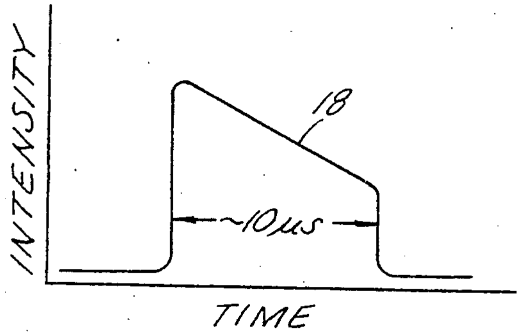
FIG. 4
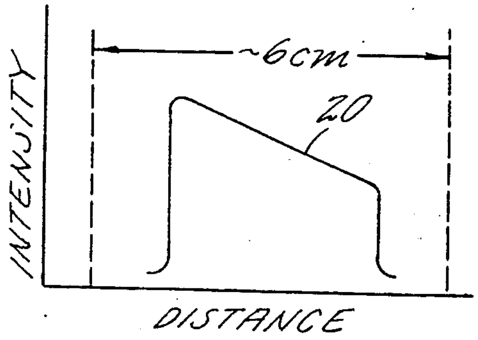
FIG. 5
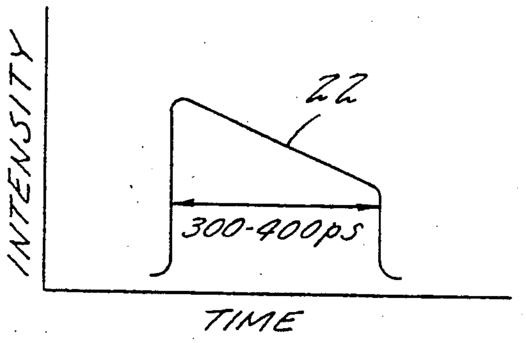
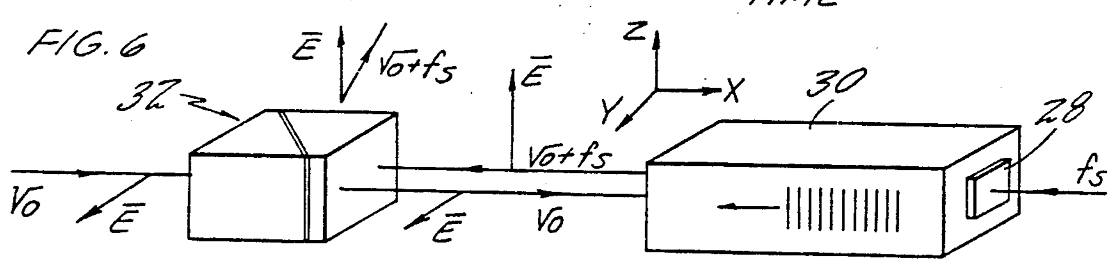

APPARATUS FOR PROVIDING PULSES HAVING ELECTRONICALLY VARIABLE CHARACTERISTICS

BACKGROUND OF THE INVENTION

1. Field of the Invention

This invention relates to the generation of pulses of electromagnetic radiation and more particularly to a system which provides elelctronically controlled optical pulses that have continuously variable durations and intensity profiles.

2. Description of the Prior Art

Various devices have a requirement for short pulses of laser energy, the pulses being controllable with respect to intensity, duration and shape. One of the more prominent of these applications is the application of short bursts of laser energy in controlled nuclear fusion work in which solid particles are subjected to pulses of laser energy to form a plasma. In these experiments the formation of plasma is hampered by the inability to produce pulses of suitable profile and of the proper duration to transform the particulate matter into a plasma in an optimized fashion. Short pulses of laser energy at high power and with various intensity profiles are needed. Investigators in fusion and other types of research have used mechanical systems to modify the characteristics of laser pulses. The primary drawback to mechanical systems is the inability to vary the characteristics of the laser pulse once a given system has been configured.

In addition, the operation of many optical radar and communication systems could be improved if short pulses of laser energy having controllable intensity profile and duration were available. In particular, variably coded sets of short pulses can be made available. The communications and fusion efforts are similar in that the present ability to provide pulse stretching and shaping is done in a limited and relatively crude fashion by essentially mechanical devices. These systems generally comprise mirrors and beam splitters at relatively fixed mechanical positions. One such system is a passive Fabry Perot cavity having a pair of partially transmissive mirrors which is excited with a single pulse to produce a series of exponentially decaying pulses equally spaced, the pulses having characteristics which are determined by the mechanical and optical properties of the cavity. Such systems are aperture limited, rigid and essentially invariable beyond the initial design.

SUMMARY OF THE INVENTION

An object of the present invention is to produce laser pulses which have variable intensity profiles and durations. A second object is to control a picosecond pulse of laser energy for signal processing and utilization in the production of high temperature plasmas. Another object of the present invention is to convert a single, nominally picosecond pulse of laser radiation into a plurality of discrete spaced apart pulses having a variable interval between pulses. Each object is accomplished in a pulse generation system which is electronically controlled.

According to the present invention a pulse of laser energy which is of picosecond duration and typically produced with a mode locked laser interacts in an optically anisotropic medium with an acoustic wave of an electronically selectable duration and intensity profile to produce a backscattered optical signal that has a prescribed intensity profile and duration.

A primary advantage of the present invention is its simplicity and reduced number of operating elements. The present invention has a very rapid response time and both the shape and length of the output pulse can be varied many orders of magnitude faster than in any comparable mechanical device. This invention is capable of pulse shapes which are not otherwise feasible because of the continuous variability of the amplitude and temporal characteristics of the electronically produced acoustic wave. The present invention has the advantage of less stringent requirements for optical alignment than mechanical systems.

The present invention may have a wide aperture and is characterized by its ruggedness, lightness, small size and relative low cost. The invention can produce an output signal which has variable amplitude shaping in the form of bursts of variably spaced pulses to form coded signals for use in optical radar or communications. Also the entire nonmechanical system is readily adaptable to relatively large changes in environmental conditions. Characteristically the output of the device is limited by the optical length of the crystal available. A further advantage of the present invention is its ability to combine several crystals in parallel to extend the duration of the output signals beyond that which would be available in a single length crystal. Signal processing in which the energy of an original picosecond duration laser pulses is spread out in time reduces the power in the output pulses accordingly.

The foregoing and other objects, features and advantages of the present invention will become more apparent in the light of the following detailed description of preferred embodiments thereof as illustrated in the accompanying drawing.

BRIEF DESCRIPTION OF THE DRAWING

FIG. 1 is a block diagram of an optical pulse generation system in which the intensity and duration of a laser pulse are electronically controlled;

FIG. 2 is a plot of a typical input pulse of optical energy;

FIG. 3 is a plot of a typical programmable RF transducer drive signal;

FIG. 4 is a plot of the acoustic signal produced internal of the acousto-optic processor by the drive signal shown in FIG. 3;

FIG. 5 is a plot of a typical, optical pulse produced with the waveforms of FIGS. 2, 3 and 4 in the system shown in FIG. 1.

FIG. 6 is the schematic drawing for a typical acousto-optic processor which includes a Glan Thomson prism in combination with a uniformly birefringement crystal having a transducer adhered to one end thereof;

DESCRIPTION OF THE PREFERRED EMBODIMENT

Figure 7:
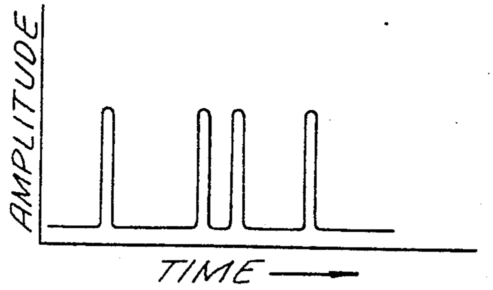
FIG. 7 is a plot of amplitude versus time of an acoustic signal for producing a coded set of output pulses.

An electronically variable, optical pulse generating system in accordance with the present invention is shown schematically in FIG. 1. A laser pulse generator 10 produces an input pulse 12 of laser energy that is nominally several picoseconds or less in duration; the pulse is transmitted to an acousto-optic processor 14. A programmable acoustic driver 16 produces a drive signal 18 which is also transmitted to the acousto-optic processor wherein an acoustic signal 20, not shown in FIG. 1, is produced. The processor emits an output pulse 22 which is variable with respect to duration and intensity over a wide range of interest. In some applications, an optical detector 24 is located in the line of travel of the optical output pulse, and the output pulse 22 is converted into an electrical signal 26. The optical input pulse 12, the acoustic drive pulse 18, the acoustic signal 20, which may be either a longitudinal or shear acoustic wave, and the optical output pulse 22 are shown in FIGS. 2, 3, 4 and 5, respectively.

Operation of the system shown in FIG. 1 requires that the input pulse 12 have a spatial extension which is small compared to the optical length of an optically anisotropic crystal 30 which is one component of the acousto-optic processor shown in FIG. 6; the processor includes a polarizing beam splitter 32 which can be a Glan Thomson prism. The crystal may be one which is inherently birefringent or one in which the birefringence is artificially induced by such means as producing anisotropic strain in an otherwise nonbirefringent material. Since the index of refraction of the crystal is greater than unity, its optical length is often approximately twice its physical length. If the spatial extension of the optical pulse approaches the optical length of the crystal, the effect on the laser pulse produced by the crystal decreases until eventually the crystal produces a negligible effect. The nominally picosecond optical input pulse 12 injected into the birefringent crystal must be polarized. The drive signal 18 activates a piezoelectric transducer 28 which in turn injects the acoustic signal into the crystal. The arrival of both the acoustic signal and the optical input at the crystal is suitably synchronized to cause spatial overlap. The acoustic signal travels in a direction which is either parallel or antiparallel to the direction of travel of the optical input pulses and the resulting strain wave induced in the crystal is capable of effecting a scattering from the polarization of the input optical pulse upon interaction therewith to the orthogonally polarized output pulse. The input optical pulse and the acoustic signal experience a resonant interaction in the linearly polarized situation when the condition $$k_e + k_a = k_o$$

is satisfied,
where $k_e$ = the wave vector of the extraordinary ray of the input optical pulse (or output pulse);

$k_o$ = the wave vector of the ordinary ray of the output optical pulse (or input pulse); and $k_a$ = the wave vector of the acoustic signal.

Resonant scattering or reflection of the input pulse by the acoustic signal forms the optical output pulse which is orthogonally polarized with respect to and travels in a direction opposite to the input optical pulse. An algebraic sum of the wave vectors for the optical pulse and the acoustic signal is zero for resonant conditions, as a result, resonant backscattering occurs throughout the entire duration during which the input optical pulse is sweeping through the acoustic signal in the crystal. The acoustic signal is essentially stationary when compared to the velocity of the light pulse sweeping through it. The backscattered optical energy which upon leaving the crystal becomes, the output pulse assumes an amplitude, shape and duration which are determined by the spatial characteristics of the acoustic signal. For example, if an input pulse, of 10 picosecond duration is injected into a crystal six centimeters in length and an acoustic signal that is 10 microseconds in duration is propagated, through the crystal simultaneously, an output signal of approximately 400 picoseconds results.

The scattering radiation is polarized orthogonally with respect to the input pulse and is easily separable therefrom with the use of a polarizing beam splitter. The acoustic driver is tuned to a frequency which produces an acoustic pulse in the crystal suitable for resonant scattering. For example, if an input optical pulse of 6,328 A were swept through a crystal of lithium niobate, an acoustic pulse of 930 MHz is required for resonant scattering. The amplitude, shape and duration of the acoustic pulse in the crystal is controlled or programmed by electronic manipulations of the timing and characteristics of the RF pulse delivered by the acoustic driver. In essence, the characteristics of interest in the output pulse are made a function of the programmable acoustic driver and are readily variable over a wide range.

The acousto-optic processor 14, detailed in FIG. 6, consists of any, known in the art, optically anisotropic crystal such as lithium niobate, calcium molybdenate, quartz or sapphire which has a stress tensor which provides coupling between two orthogonal polarizations. Attached to one end of the bar shaped crystal is a suitable transducer which produces various acoustic pulses at a preselected frequency. For example, lithium niobate requires a transducer operating at about 990 MHz for 7,000 A optical pulses while the calcium molybdenate would require a transducer operating at nominally 50–100 MHz. The output pulse is utilized efficiently by locating the polarizing beam splitter between the pulse generator and the crystal as is shown. This arrangement linearly polarizes the input pulse prior to entry into the crystal if it is not already polarized; also, the radiation backscattered in the crystal is intercepted by the beam splitter and is redirected away as the output pulse along a line of travel which is different from the direction of travel of the input pulse.

The physics of the operation of an optically anisotropic crystal such as the one shown in FIG. 6 are well known and are described extensively in several publications by Harris, et al., namely, *Acousto-Optic Tunable Filter*, Journal of the Optical Society of America, Vol. 59, No. 6, June, 1969, Page 744, *Electrically Tunable Acousto-Optic Filter*, Applied Physics Letters, Vol. 15, No. 10, November 1969, page 325, and *$CaMoO_4$ Electronically Tunable Optical Filter*, Applied Physics Letters, Vol. 17, No. 5, September, 1970, page 223.

A Bragg scattering type interaction can theoretically be utilized as an alternate method of producing the resonant backscattering condition required in this invention. The condition for resonant backscatter of the input laser pulse requires that the wavelength of the acoustic signal be half the wavelength of the optical pulse. Thus, the necessary frequency range of the input acoustic pulses is between 10 and 20 GHz, where room temperature attenuation of such high frequencies is extremely large, so large in fact as to render this approach impractical. Even at liquid helium temperatures where attenuation is much lower, the implementation is impractical.

Various acousto-optic scattering devices are described in the literature, however, only those providing resonant backscattering in which the input is colinearly scattered in the antiparallel direction are functionable in accordance with the present invention. Input pulses suitable for use in this invention can be provided with any of the variety of mode lock lasers described extensively elsewhere. Any mode locked laser such as a gas laser, or a neodymium glass, or Nd:YAG system which has a sufficient bandwidth to produce a pulse duration of approximately a few picoseconds is adequate. The optical input pulse produced in the laser resonator must be short in duration compared to the optical length of the crystal to produce significant results, and the pulse must also be polarized prior to entry into the crystal.

The programmable RF driver of the piezoelectric transducer which has been described in the literature, must have several properties. The driver provides electrical pulses of RF energy at a particular preselected frequency, further, the duration, intensity and amplitude profile of these electrical pulses are programmable over the range of interest by electronic means. In practice, the electric pulses from the programmable driver are synchronized with the mode locked pulses produced in the laser, that is, the electric signals are fed to the transducer at precisely the proper time to cause the acoustic signal to be present in the birefringement crystal simultaneously with the optical input pulse to produce the desired form of optical backscatter. In this manner, the optical output pulses can be adjusted to a variety of shapes and lengths consistent with the physical constrains of the system, by injecting a laser pulse from the laser resonator and appropriately programming the acoustic driver to produce a suitable acoustic signal.

This invention enjoys relatively relaxed optical alignment requirements as is apparent from the drawing. Aside from the mirrors which are required in the resonator of the laser energy generator, there are no other critical optical reflecting surfaces in the system. This situation is very much different from the previously mentioned Fabry-Perot system which requires precise alignment and positioning of the mirrors. The present invention is a rugged, lightweight, inexpensive, and relatively small volume, wide apertured device that is relatively insensitive to environmental conditions such as temperature.

Figure 8:
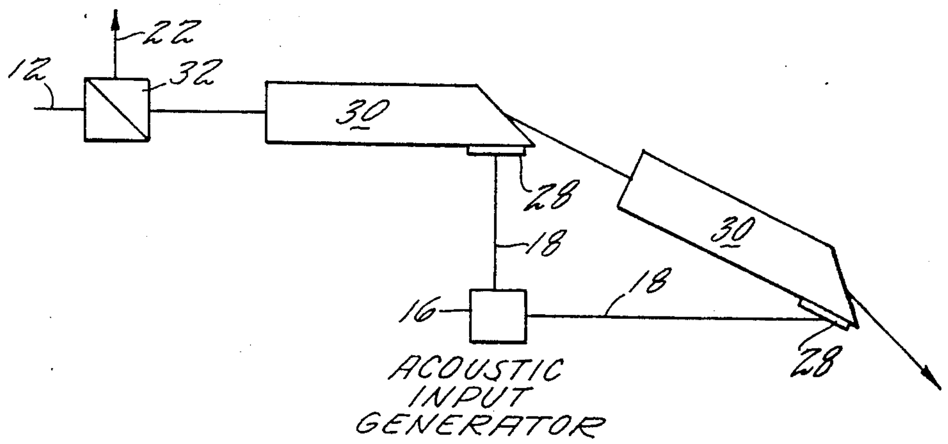
FIG. 8 is a schematic drawing of a two crystal system in accordance with the present invention.
Figure 9:
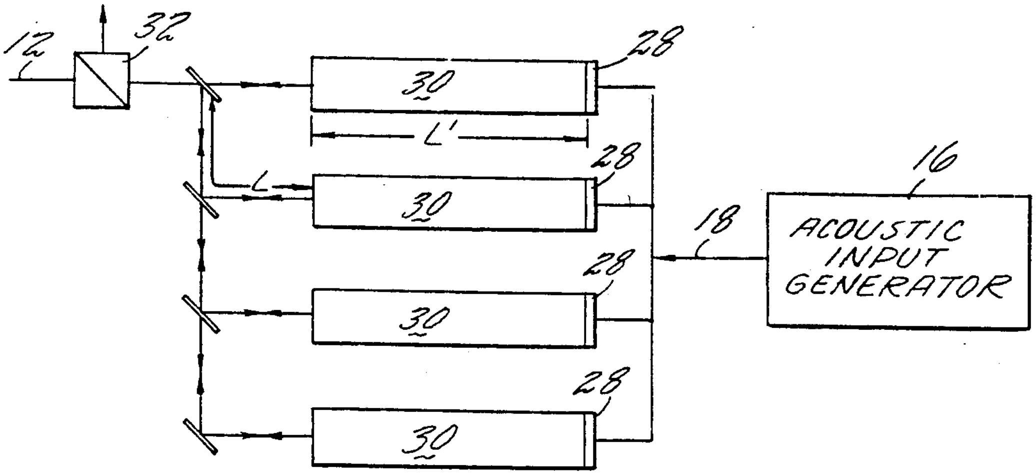
FIG. 9 is a schematic drawing of a multicrystal system.

When an acoustic pulse having an intensity profile as is shown in FIG. 7, for example is injected into a suitable medium, an output optical pulse having a similar distribution is formed. The velocity of the acoustic signal in the crystal is typically between $10^5$ and $10^6$ centimeters per second, and the velocity of light in the crystal is approximately $4 \times 10^{10}$ centimeters per second so that the latter pulse is approximately $10^5$ smaller than the acoustic pulse. More specifically, if the acoustic velocity is $4 \times 10^5$ centimeters per second and the optical velocity in the crystal is $4 \times 10^{10}$ centimeters per second, then an interpulse spacing of one microsecond in the acoustic signal results in an interpulse spacing of 10 picoseconds in the optical pulses. The modulation of picosecond pulses on this scale cannot be performed in an electronically programmable fashion except as demonstrated by the present invention. A further use for the present invention involves arranging several crystals either in series or parallel to increase the total time over which the input optical pulse can be processed. Typical combined crystal schemes are shown in FIG. 8 and FIG. 9. In FIG. 9 the optical pathlength L can be adjusted with respect to the optical pathlength L' of the first crystal; (the same being true for successive crystals) so that the initial optical pulse can be stretched or otherwise processed over the combined optical propagation times of all the crystals.

Although the invention has been shown and described with respect to preferred embodiments thereof it should be understood by those skilled in the art that the foregoing and various changes and omissions in the form and detail thereof may be made therein without departing from the spirit and the scope of the invention.

Having thus described a typical embodiment of my invention, that which I claim as new and desire to secure by Letters Patent of the United States is:

1. An optically variable pulse generation system in which input pulses of polarized laser energy are scattered from pulses of acoustic energy to provide output pulses of optical energy which are orthogonally polarized with respect to, and travel in a direction opposite to the input optical pulses, the output pulses having selectably variable intensity profiles and durations in the subnanosecond range, the system comprising:

acousto-optic means including a length of an acousto-optic medium which is optically anisotropic and has a longitudinal axis extending along its length;

means for providing polarized pulsed electromagnetic radiation which is the source of input laser energy and which is aligned so that the input laser energy passes through the medium along the longitudinal axis;

means for providing RF electric signals having selectively variable frequency intensity and duration characteristics; and means responsive to the RF electric signals for providing continuously variable acoustic signals which propagate internal of the medium along the longitudinal axis, the acoustic signal means being fixedly attached to the medium.

2. The invention according to claim 1 including means for synchronizing the arrivals of both the input laser energy and the acoustic signals at the medium to allow the laser energy to interact with the acoustic signals internal of the medium and to provide resonant scattering of output pulses of optical energy.

3. The invention according to claim 1 wherein the means for providing the input laser energy is a mode locked laser.

4. The invention according to claim 2 wherein the acousto-optic means comprises:

an optically anisotropic medium;

means for polarizing the input laser energy; and means for optically separating the pulsed input energy from the output pulse.

5. The invention according to claim 4 including means for converting the optical pulses into electrical signals.

6. The invention according to claim 1 wherein the acousto-optic means includes a plurality of discrete media.

7. The method of producing optical pulses having continuously variable intensity profiles and durations in the subnanosecond range including the steps of:

providing pulses of polarized electromagnetic radiation in the form of input laser energy;

providing acoustic signals which are continuously variable with respect to intensity profile and duration, in a length of an optically anisotropic medium having a longitudinal axis extending along the length of the medium; and injecting both the acoustic signals and the input optical pulses into the medium in a longitudinal direction to produce a resonant backscattering of the input optical pulses from the acoustic signals to cause optical output pulses from the medium, the output pulses having intensity profiles and durations which correspond to the intensity profiles and durations of the acoustic signals.

* * * * *